United States Patent [19]
Teasley et al.

[11] 4,318,019
[45] Mar. 2, 1982

[54] ALTERNATOR FOR WIND GENERATOR

[76] Inventors: Granvil E. Teasley, 1101 Elizabeth; Allen V. Parker, 2040 Harvard, both of Barstow, Calif. 92311

[21] Appl. No.: 148,407

[22] Filed: May 9, 1980

[51] Int. Cl.³ .......................................... H02K 21/12
[52] U.S. Cl. .................................. 310/156; 310/268; 290/44; 290/55
[58] Field of Search ............... 310/268, 156, 198–208, 310/181; 290/44, 45

[56] References Cited
U.S. PATENT DOCUMENTS 3,699,372  10/1972  Abe et al. ............................ 310/268
4,162,410  7/1979   Amick ................................. 310/268
4,207,487  6/1980   Beyersdorf ........................... 310/268

*Primary Examiner*—J. V. Truhe
*Assistant Examiner*—Morris Ginsburg
*Attorney, Agent, or Firm*—Warren F. B. Lindsley

[57] ABSTRACT

An alternator for wind generator use employing a pair of stators having a rotor mounted therebetween in planar coaxial relationship. The stators have radially slotted coil forms integral therewith in which coils are wound in a serpentine fashion. The rotor is provided with an aluminum rim slotted in a radial manner inwardly of its periphery to hold permanent magnets, which magnets through the aid of the rim concentrate eddy currents in the coils in an improved manner.

9 Claims, 12 Drawing Figures

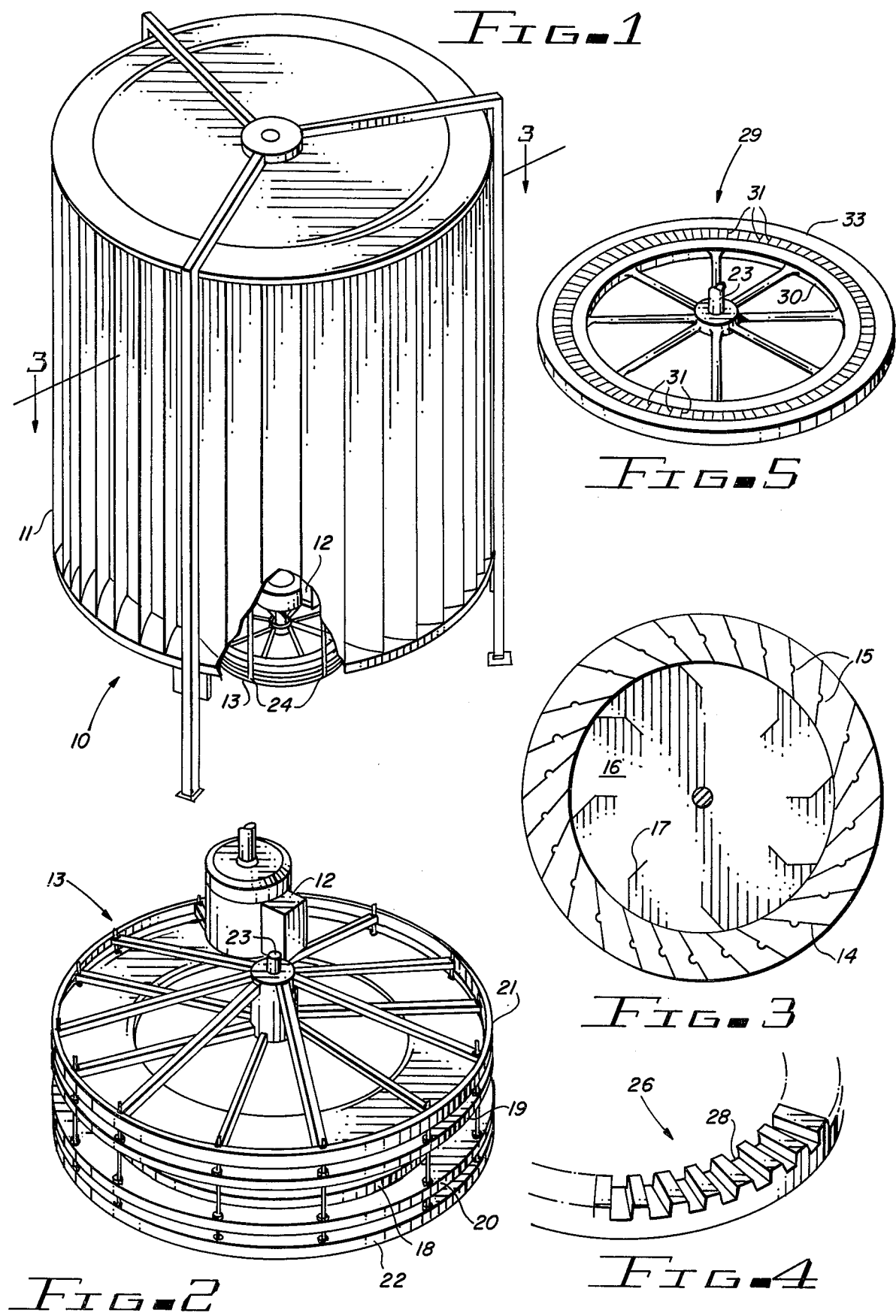

ALTERNATOR FOR WIND GENERATOR

BACKGROUND OF THE INVENTION

In recent years the rapid expansion of the world's population coupled with the accelerated technological development of large sectors of the world has produced a dramatic increase in the demand for energy in all forms including fuels and electricity for heating, lighting, transportation and manufacturing processes. The construction of hydroelectric facilities and the development of fossil fuel resources has continued at a rapid rate, but it becomes increasingly evident for a number of reasons that these efforts are inadequate to keep pace with the demands of the growing population.

A first difficulty is the limited availability of fuels such as oil and natural gas. Most countries in the world today do not have adequate sources of these fuels within their own boundaries and are dependent upon foreign sources, notably the Middle East countries for supply. Such a dependence can and does have undesirable effects on the economies of the countries involved and political complications often result. There are also limited sites available that are appropriate for hydroelectric installations.

More recently, the hope that nuclear power would soon lead to a rapid solution of the energy dilemma has been cooled by delays stemming again from environmental concerns and reservations about the safety of such plants and about the adequacy of plans for handling the radioactive wastes associated with such installations.

In the face of these growing demands and limited resources, there is one source of energy which is readily available to every country in the world in virtually unlimited quantities. This virtually untapped source is wind energy.

The interest in this almost boundless resource and in its development and harnessing for use in homes and factories is rising as other resources dwindle. Its desirability is further enhanced by the fact that wind energy may be converted to practical use without the hazard of environmental contamination.

History does not record the date of the invention of windmills, i.e., one of the first land uses of wind movement, but it is known that windmills were used in Europe as early as the 12th century A.D. In windmills used for general power purposes including pumping, sawing, grinding etc., the power is transmitted through a train of gears to a vertical shaft. Any torque exerted by the gearing upon the vertical shaft reacts upon the windmill itself tending to rotate it out of its normal position with regard to the direction of the wind.

In addition to the stresses upon the windmills and their gearing arrangements, the known windmills were usually mounted upon towers of heights ranging from 10 to 100 or more feet so that the wind which acts upon them will not be seriously affected by obstructions which may exist in their immediate neighborhoods.

In order to increase the effectiveness of hardware necessary to harness wind movement, it is necessary to create a wind energy system which will function effectively at wind currents as low as 7 to 10 miles per hour velocity and at speeds reaching their maximum velocities with a simple and economical device requiring little maintenance and upkeep activities. The device must be able to generate electricity, store it, feed it back into utility power grids or use it directly. Such a system and device requires a new and novel electric alternator for effective operation with the modern day wind turbines.

DESCRIPTION OF THE PRIOR ART

Heretofore alternators utilizing permanent magnets in rotation past conductive windings have been employed to generate induced electric outputs, but none have harnessed wind energy effectively.

U.S. Pat. No. 3,884,317 discloses a power operated cycle including a manually powered generator.

U.S. Pat. No. 3,867,656 discloses a brushless direct current motor having a flat type stator with a magnetic sensitive element disposed within the magnetic flux of the rotor for detecting the condition of the magnetic flux and the driving coils having direct current passing therethrough in response to a detection signal produced by the magnetic sensitive element.

U.S. Pat. No. 3,762,042 discloses a disc type rotor comprising a plurality of wedge-shaped core segments arranged in a circular array.

U.S. Pat. No. 3,610,974 discloses a magnetic motor and generator employing magnetic forces of a permanent magnet and an electromagnet to create rotary movement between spaced apart magnetic means having their pole pieces arranged in opposing juxtapositioned relationship.

U.S. Pat. No. 3,247,407 discloses an alternator which utilizes the force of magnetic attraction or repulsion between permanent magnets to generate extremely high induced electrical output values.

U.S. Pat. No. 3,230,406 discloses high frequency electromechanical generators operating on the principle of modulating a permanent magnetic multipolar field in a particular rotor and stator arrangement.

U.S. Pat. No. 2,993,159 discloses a motor employing a rotor formed of non-magnetic material and carrying two groups of permanent magnets, the groups being arranged concentrically at different radial distances completely around the axis of rotation of the rotor. The stator means includes a first magnetic means forming an air gap through which one of the groups of magnets pass and the second magnetic means forms another air gap through which the other of the groups of permanent magnets pass.

U.S. Pat. No. 2,027,402 discloses an electric generator adapted to utilize the wind as a source of power to supply an electric power load.

SUMMARY OF THE INVENTION

In accordance with the invention claimed, a new and improved energy generating system is disclosed employing a novel alternator driven by a wind turbine or other suitable means.

It is, therefore, one object of this invention to provide a new and improved windmill energizing system.

Another object of this invention is to provide a new and improved alternator and/or motor design.

A further object of this invention is to provide an improved magnetic motor and/or alternator design which is simple in construction, low in cost and capable of operating at varying and relatively low wind conditions.

A still further object of this invention is to provide improved core segments for rotors and method of attachment to a rotor.

A still further object of this invention is to provide a new and improved method and means for generating electricity from a varying wind source employing a unique magnetic field structure producing extremely high induced voltages from the interaction between relatively slow moving permanent magnetic fields employed in the field structure.

Further objects and advantages of the invention will become more apparent as the following description proceeds and the features of novelty which characterize this invention will be pointed out with particularity in the claims annexed to and forming part of this specification.

BRIEF DESCRIPTION OF THE DRAWING

The present invention may be more readily described by reference to the accompanying drawing, in which:

FIG. 1 is a perspective view of a wind turbine, gear box and alternator embodying the invention;

FIG. 2 is a perspective view of the alternator shown in FIG. 1;

FIG. 3 is a cross-sectional view of the wind turbine of FIG. 1 as viewed along line 3—3 of FIG. 1;

FIG. 4 is a perspective view of a portion of the coil form utilized in the stator of FIGS. 1, 2, 7, 8 and 9 for the support of the conductive windings;

FIG. 5 is a perspective view of the rotor employed in the alternator of FIG. 2;

DESCRIPTION OF THE PREFERRED EMBODIMENT

Figure 6:
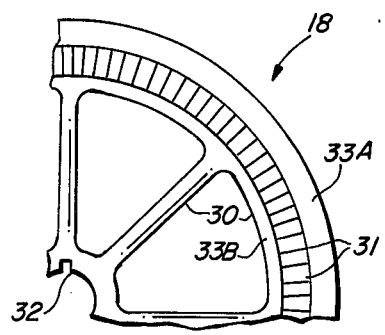
FIG. 6 is an enlarged plan view of one quadrant of the rotor of FIG. 5.

Referring more particularly to the drawings by characters of reference, FIGS. 1-12 disclose an apparatus or device 10 comprising a wind turbine 11 connected through a gear box 12 to an alternator 13.

The wind turbine comprises a horizontally rotating vertical axis turbine type structure having fixed outer blades 14. The design is omni-directional operating from wind speeds as low as 4 to 8 miles per hour with the best operating conditions existing between 10 to 18 miles per hour. Although during times when the wind speeds are greater than 22 miles per hour and most propeller driven wind mills are inoperative, the wind turbine disclosed will operate effectively even continuing to operate until the wind speed approaches 45 to 50 miles per hour. At this point, the maximum amount of wind entering the turbine has been obtained and the excess wind begins to flow around the turbine thereby eliminating the possibility of a "run away" turbine. The greatest advantage of this type of turbine over propeller driven wind machines is that it has no need to "yaw" into the wind, thereby losing power and efficiency and may be tower and roof top mounted with little or no difficulty.

As shown in the cross-sectional view of FIG. 3, the fixed outer blades 14 are substantially flat with a shallow centered longitudinally extending ridge 15 provided therein for strength.

The turbine rotor 16 has eight vertical vanes 17. The vanes are formed to a shallow "V" or trough shape in cross-sectional configuration for aerodynamic purposes as well as for strength, the "V" cross-section extending the full length of the vanes.

The gear box 12 is a simple and conventional gearing arrangement for gearing up or down the relative rotation of the wind turbine 11 relative to the alternator 13.

The alternator 13 as shown in FIG. 2 comprises a rotor 18, upper and lower stator members, 19 and 20, respectively, and upper and lower stator supports, 21 and 22, respectively.

The upper and lower stator supports, 21 and 22, are in the form of spoked wheels with open hubs that carry the axle 23 of rotor 18. Vertical struts 24 are attached to the peripheries of the stator supports 21 and 22. The upper ends of the struts 24 are secured to the lower framework of turbine 11 as shown in FIG. 1.

Stator members 19 and 20 each comprise a ring-shaped frame 25 having a radially-slotted coil form 26 formed integral therewith on their juxtapositioned surfaces. Windings or coils 27A, 27B and 27C are positioned in the coil forms, as shown in FIGS. 4, 7, 8 and 9 with the top surface of form 26 fashioned with uniformly spaced rectangular slots or grooves 28.

Figure 7:
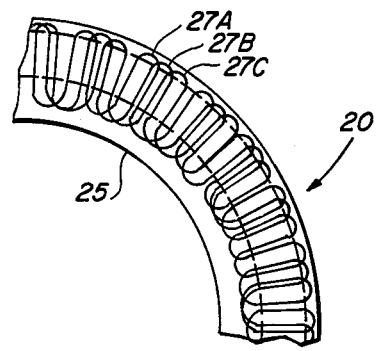
FIG. 7 is a plan view of one quadrant of the stator of FIGS. 1 and 2 with three phase windings shown.
Figure 9:
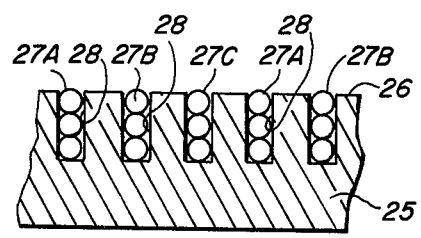
FIG. 9 is a cross-sectional view of the windings as viewed along line 9—9 of FIG. 8.
Figure 8:
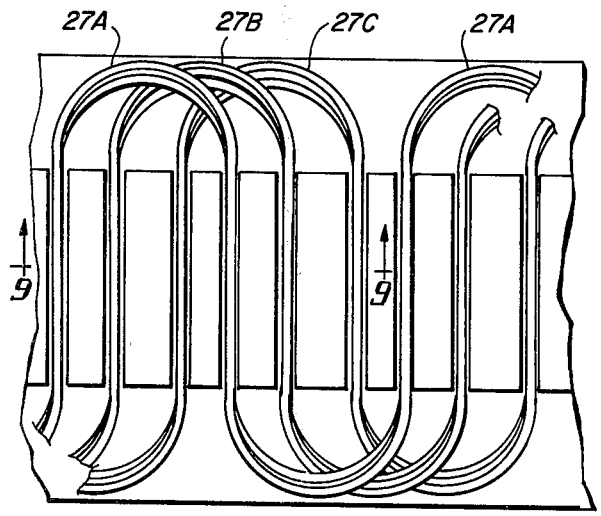
FIG. 8 is an enlarged view of a small portion of the stator of FIG. 7 showing details of the construction of the windings.

As illustrated in FIGS. 7, 8 and 9 coil 27A is wound in a serpentine fashion, passing radially inwardly and outwardly through every third slot of form 26. This coil serves as one of three phase windings carried by stator member 20. The positioning of the other two phase windings, 27B and 27C, are shown in FIGS. 7, 8 and 9 with each of the three phase windings 27A, 27B and 27C comprising three parallel conductors. The three parallel conductors of each winding are stacked vertically within slots 28 of form 26 in the manner shown in FIG. 9. As indicated earlier, winding 27A occupies every third slot of coil form 26. Winding 27B is identically wound in a set of slots 28 displaced one slot to the right from those occupied by windings 27A, and winding 27C is wound in another set of slots 28 displaced one slot to the right of winding 27B, so that in progressing from slot to slot one encounters winding 27A, then 27B, then 27C, then 27A, 27B etc. as shown in FIG. 7.

Frame 25 and form 26 are each fabricated from a suitable non-conductive and non-magnetic material.

Stator member 19 is a mirror image of stator member 20 with their windings facing rotor 18 parallelly and coaxially arranged therebetween.

The alternator rotor 18 as shown in FIGS. 5, 6, 10 and 11 comprises a wheel-shaped configuration 29 formed on a rotor frame 30 fashioned from conductive material such as aluminum in the shape of a spoked wheel. A plurality of pairs of permanent magnets 31 are positioned around its periphery with a keyed opening 32 arranged at its axis for mounting to the rotor axle 23. The outer periphery 33 of rotor 18 is provided with a plurality of openings 34 formed and dimensioned to each receive a pair of magnets 31. These openings 34 are equal in number to the number of slots occupied by one of the windings 27A, 27B or 27C and are evenly spaced about rim 33 at a constant radius from the axis of frame 30.

Figure 10:
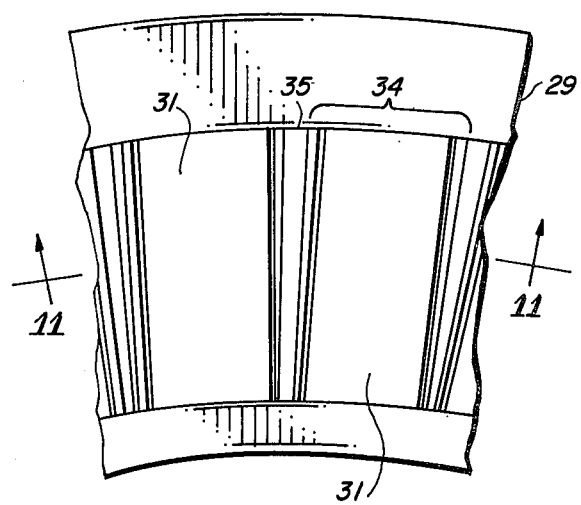
FIG. 10 is an enlarged view of a small sector of the rotor of FIGS. 5 and 6.
Figure 11:
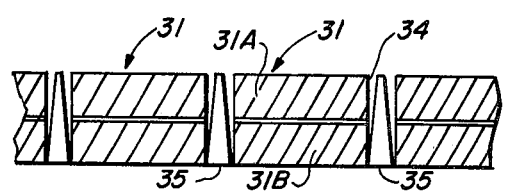
FIG. 11 is a cross-sectional view of the rotor of FIG. 5 as seen along line 11—11 of FIG. 10.

Adjacent openings 34 are separated by ribs 35 that are tapered both radially and from the far to the near surface of rotor 18 (as viewed in FIGS. 10 and 11). Each opening 34 holds a pair of magnets 31 which are cemented in place.

Each pair of magnets comprises an upper magnet 31A and a lower magnet 31B as shown in FIG. 11. Magnets 31A and 31B are uniformly shaped and are similar in proportions and dimensions to a domino although other shapes and sizes of magnets may be used, for example, keystone shapes, etc. The magnetization of the individual magnets is perpendicular to the large faces of the magnets and in each pair of magnets 31 the upper and lower magnets 31A and 31B are stacked so that their respective fields are series-aiding, i.e., if the lower face of the lower magnet 31B is a north pole and its upper face a south pole, the lower face of its companion upper magnet 31A will be a north pole and its upper face a south pole.

The magnetic senses or polarizations of adjacent pairs of magnets are opposite i.e., if the north poles of a given pair of magnets 31 are positioned upward, the north poles of adjacent pairs of magnets 31 to either side are positioned downward so that as one progresses from pair to pair over the upper or lower surfaces of the pairs of magnets 31 a field reversal is encountered at each location of a pair of magnets. The nature of the external field resulting from this arrangement of the pairs of magnets 31 is shown in FIG. 12 by the magnetic lines of flux 36.

Figure 12:
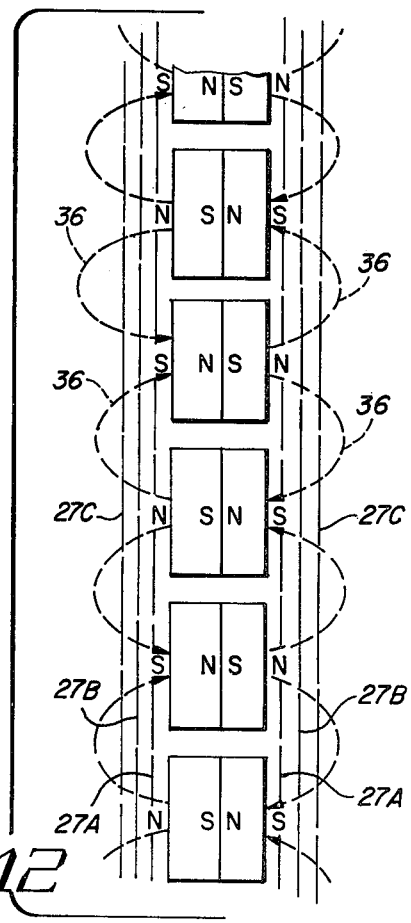
FIG. 12 is a diagrammatic illustration of the permanent magnets arranged in the rotor shown in FIGS. 5 and 6 together with an illustration of the associated stator windings.

Also represented in FIG. 12 are the phase windings 27A, 27B and 27C of the upper and lower stator members 19 and 20, respectively. It will be recognized from FIG. 12 that as the pairs of magnets 31 are moved from left to right relative to the fixed positions of the windings 27A, 27B and 27C, an alternating current voltage will be induced in each of the windings and that because of the angular displacement of the windings 27A, 27B and 27C the induced voltages of the three windings will be 120 degrees out of phase. Because each successive pass of each winding through the slots 28 is in the opposite direction radially and because the field polarization at each successive pass is reversed, the voltages induced at the successive passes are additive. The corresponding phase windings 27A, 27B and 27C of the upper and lower stator members 19 and 20 may be serially or parallelly connected as desired to achieve twice the individual voltage or current capacities, respectively. The frequency of the induced voltages is obviously proportional to the speed of rotation of rotor 18 about its axle 23.

A salient feature of the physical structure of alternator rotor 18 is the use of the electrically conductive material from which the frame of rotor 18 is formed. The periphery or rim 33 is noted in FIGS. 6 and 10 to extend both radially outward and radially inward from the position of the pairs of magnets 31 so that an outer ring portion 33A and an inner ring portion 33B are formed on opposite sides of the magnet pairs as shown in FIG. 6. The presence of these outer and inner ring portions 33A and 33B were found experimentally to enhance the performance of the alternator 13. The enhancement was in the form of improved performance under load, especially at heavy loads and conditions approximating a short circuit at the output terminals. Under such conditions the torque required to turn the rotor was significantly reduced and the operating efficiency was improved. These effects appear to be produced as the result of eddy currents induced in the outer and inner ring portions 33A and 33B. One possible explanation is that the eddy currents aid in the confinement of the magnetic field to the areas occupied by the windings 27A, 27B and 27C; an alternate or companion explanation is that the eddy currents produce a magnetic field that tends to aid the rotation of the alternator rotor 18. With regard to the confinement explanation, it should be noted that as the rotor begins to rotate, the magnetic field produced by the magnets causes a current flow in the coils which in turn creates an opposing magnetic field in the coils of the same polarity as the magnets. The coils in turn induce an opposing magnetic field in the conductive aluminum rings 33A and 33B adjacent it. Thus, three opposing fields are alternately created around the rotor. Since the line of force created by the magnets seek the path of least resistance and the magnetic fields in the aluminum rings above and below the magnets oppose the flux passage through them, the flux is then focused through the coils resulting in a greater flux density cutting the coils than would have occurred without the inner and outer aluminum rings 33A and 33B. As the load approaches a short circuit condition, the current flow in the coils increases, thereby increasing the intensity of the field of the aluminum rings which further focuses the combined fields of the magnets and the inner and outer rings through the areas of the coils. This action could account for the high output of the alternator at relatively low RPM.

An additional salient feature of the construction of alternator 13 is that no magnetic materials may be utilized, if so desired, except in the magnets. Magnetic losses including hysteresis and eddy current losses are thus reduced accordingly. The result of this and other features of construction is a high overall operating efficiency with predictions of it reaching 85 to 95 percent. This is considerably better than that now achieved by devices now in the marketplace.

It will be further recognized that the construction of the alternator is extremely simple and that inexpensive materials and means of fabrication may be utilized. The rotor frame 30 may be readily cast in a single piece from aluminum. The stator frame 25 and coil form 26 may be molded from a suitable plastic or epoxy material as a single integral member. The permanent magnets are also inexpensive in the marketplace.

Because the windings 27A–27C are stationary no slip rings are required, and because a three-phase voltage is generated the output may be rectified and inexpensively filtered to provide a d-c source.

It should be noted that the rotor magnets should be positioned directly over the straight passes of the coil windings through the slots 28 in form 26 with the radii of the windings extending adjacent to or just over the free edges of the inner and outer rings 33A and 33B. This positioning of the rotor magnets and coils is important so that the field of the coils will further involve the aluminum rings.

A significantly improved alternator and wind energy apparatus are thus provided in accordance with the stated object of the invention, and although but a single embodiment of the invention has been illustrated and described it will be apparent to those skilled in the art that various changes and modifications may be made therein without departing from the spirit of the invention or from the scope of the appended claims.

What is claimed is:

1. A machine for generating electricity comprising:

a pair of axially arranged spacedly positioned and fixedly mounted stators formed of non-conductive, non-magnetic material, a rotor formed of conductive, non-magnetic material mounted for rotation between said stators in parallel relationship thereto;

each of said stators comprising a plurality of coils mounted thereon to extend around its periphery in a serpentine manner on a surface thereof facing said rotor, said rotor being formed in the shape of a wheel provided with a rim of a predetermined width and defining a plurality of openings spacedly positioned around its periphery within said rim, the width of the portion of said rim extending radially outward of said openings in said rotor being greater than the width of the portion of said rim extending radially inward of said openings, a plurality of permanent magnet means one mounted within each of said openings, said magnet means being arranged in sequence around said rim such that polarization of adjacent magnet means cause a field reversal in said coils as said rotor is rotated between said stators in magnetic proximity thereto, said predetermined width being of a size sufficient such that eddy currents induced therein produce a magnetic field that aids rotation of said rotor.

2. The machine set forth in claim 1 wherein:
said permanent magnet means each comprise a pair of attached magnets having unlike poles facing each other.

3. The machine set forth in claim 1 wherein:
said openings are wedge shaped the sides of which extend radially outward of said rotor and define a gap between said permanent magnet means and said sides of said openings.

4. The machine set forth in claim 1 wherein:
the width of the portion of said rim extending radially outward of the openings in said rotor is at least twice the width of the remaining portion of said rim extending radially inward of said openings.

5. The machine set forth in claim 1 wherein:
said stators comprise a ring shaped configuration of substantially the same size as said wheel of said rotor, and
said coils are arranged on said stators in a position to be traversed by said magnet means upon rotation of said rotor.

6. The machine set forth in claim 1 in further combination with:
an input drive means coupled to said rotor for rotating said rotor mounted permanent magnet means.

7. The machine set forth in claim 6 wherein:
said input drive means comprises a wind powered turbine connected to said rotor for actuation thereof.

8. The machine set forth in claim 1 wherein:
said rim is formed of aluminum.

9. The machine set forth in claim 8 wherein:
said coils extend juxtapositioned to and laterally across substantially the full width of said rim.

* * * * *